United States Patent
Kondo et al.

(10) Patent No.: US 6,549,672 B1
(45) Date of Patent: Apr. 15, 2003

(54) METHOD AND APPARATUS FOR RECOVERY OF ENCODED DATA USING CENTRAL VALUE

(75) Inventors: Tetsujiro Kondo, Kanagawa-Prefecture (JP); James J. Carrig, San Jose, CA (US); Yasuhiro Fujimori, Cupertino, CA (US); William Knox Carey, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/342,296

(22) Filed: Jun. 29, 1999

(51) Int. Cl.⁷ .................................................. G06K 9/36
(52) U.S. Cl. ........................ 382/239; 382/232; 382/233
(58) Field of Search ................................ 382/232, 233, 382/239; 375/240.2; 714/701; 341/50

(56) References Cited

U.S. PATENT DOCUMENTS

| | | | |
|---|---|---|---|
| 3,311,879 A | 3/1967 | Daher | 340/146.1 |
| 3,805,232 A | 4/1974 | Allen | 340/146.1 |
| 4,361,853 A | 11/1982 | Remy et al. | 358/167 |
| 4,381,519 A | 4/1983 | Wilkinson et al. | 358/21 R |
| 4,419,693 A | 12/1983 | Wilkinson et al. | 358/167 |
| 4,509,150 A | 4/1985 | Davis | |
| 4,532,628 A | 7/1985 | Matthews | 371/13 |
| 4,574,393 A | 3/1986 | Blackwell et al. | 382/17 |
| 4,586,082 A | 4/1986 | Wilkinson | 358/160 |
| 4,656,514 A | 4/1987 | Wilkinson et al. | 358/160 |

(List continued on next page.)

FOREIGN PATENT DOCUMENTS

| | | | |
|---|---|---|---|
| EP | 0 398 741 A | 11/1990 | H04N/7/13 |
| EP | 0 527 611 | 8/1992 | H04N/9/80 |
| EP | 0 558 016 | 2/1993 | H04N/7/133 |
| EP | 0 566 412 A2 | 4/1993 | H04N/5/21 |
| EP | 0 571 180 A2 | 5/1993 | H04N/7/137 |
| EP | 0 592 196 A2 | 10/1993 | H04N/5/21 |
| EP | 0 596 826 | 11/1993 | H04N/5/92 |
| EP | 0 605 209 A2 | 12/1993 | H04N/7/13 |
| EP | 0 610 587 | 12/1993 | H04N/5/265 |
| EP | 0 597 576 A | 5/1994 | H04N/7/13 |
| EP | 0 651 584 A2 | 10/1994 | H04N/7/54 |
| EP | 0 680 209 | 4/1995 | H04N/5/91 |
| EP | 0 746 157 A2 | 5/1996 | H04N/7/01 |
| EP | 0 833 517 | 4/1998 | H04N/7/30 |
| GB | 2 320 836 A | 11/1997 | H04N/7/68 |
| JP | 7-67028 | 3/1995 | H04N/5/235 |
| WO | WO96/07987 | 9/1995 | G06T/1/00 |
| WO | WO 99/21285 | 10/1998 | H03M/13/00 |
| WO | 99 21090 A | 4/1999 | G06F/11/00 |

OTHER PUBLICATIONS

International Search Report PCT/US00/16611, 7 pgs., Oct. 17, 2000.
International Search Report PCT/US00/03743, 4 pgs., Feb. 11, 2000.
International Search Report PCT/US00/03508, Feb. 9, 2000, 8 pgs.

(List continued on next page.)

*Primary Examiner*—Anh Hong Do
(74) *Attorney, Agent, or Firm*—Blakely, Sokoloff, Taylor & Zafman LLP

(57) ABSTRACT

The present invention provides a method for comprising data by determining a central value that is greater than the minimum value and less than the maximum value of the range of data. In one embodiment, the central value is chosen to be a value that substantially reduces a decoding error in the event that the range of values is subsequently estimated. In one embodiment, the central value is the value that minimizes the expected mean square error during reconstruction when there is an error. In one embodiment, the maximum and minimum values represent intensity data for pixels of an image. In another embodiment, the compression process is Adaptive Dynamic Range Coding, and the central value is a value within the dynamic range, excluding the maximum and minimum values.

25 Claims, 4 Drawing Sheets

U.S. PATENT DOCUMENTS

| | | | | |
|---|---|---|---|---|
| 4,675,735 A | 6/1987 | Wilkinson et al. | ........... | 358/160 |
| 4,703,351 A | 10/1987 | Kondo | ........... | 358/135 |
| 4,703,352 A | 10/1987 | Kondo | ........... | 358/135 |
| 4,710,811 A | 12/1987 | Kondo | ........... | 358/135 |
| 4,722,003 A | 1/1988 | Kondo | ........... | 358/135 |
| 4,729,021 A | 3/1988 | Kondo | ........... | 358/135 |
| 4,772,947 A | 9/1988 | Kono | ........... | 358/135 |
| 4,788,589 A | 11/1988 | Kondo | ........... | 358/133 |
| 4,807,033 A | 2/1989 | Keesen et al. | ........... | 358/167 |
| 4,815,078 A | 3/1989 | Shimura | ........... | 370/30 |
| 4,845,560 A | 7/1989 | Kondo et al. | ........... | 358/133 |
| 4,885,636 A | 12/1989 | Sullivan | ........... | 358/133 |
| 4,890,161 A * | 12/1989 | Kondo | ........... | 358/135 |
| 4,903,124 A * | 2/1990 | Hoshi et al. | ........... | 358/133 |
| 4,924,310 A | 5/1990 | Von Brandt | ........... | 358/136 |
| 4,953,023 A | 8/1990 | Kondo | ........... | 358/135 |
| 4,975,915 A | 12/1990 | Sako et al. | ........... | 371/37.4 |
| 5,023,710 A | 6/1991 | Kondo et al. | ........... | 358/133 |
| 5,052,021 A * | 9/1991 | Goto et al. | ........... | 375/76 |
| 5,086,489 A | 2/1992 | Shimura | ........... | 382/232 |
| 5,093,872 A | 3/1992 | Tutt | ........... | 382/232 |
| 5,101,446 A | 3/1992 | Resnikoff et al. | ........... | 382/232 |
| 5,122,873 A | 6/1992 | Golin | ........... | 358/133 |
| 5,134,479 A | 7/1992 | Ohishi | ........... | 358/140 |
| 5,142,537 A | 8/1992 | Kutner et al. | ........... | 371/31 |
| 5,150,210 A | 9/1992 | Hoshi et al. | ........... | 358/135 |
| 5,159,452 A | 10/1992 | Kinoshita | ........... | 358/141 |
| 5,166,987 A | 11/1992 | Kageyama | ........... | 382/232 |
| 5,177,797 A | 1/1993 | Takenaka et al. | ........... | 382/232 |
| 5,185,746 A | 2/1993 | Tanaka et al. | ........... | 371/40.1 |
| 5,196,931 A * | 3/1993 | Kondo | ........... | 358/133 |
| 5,208,816 A | 5/1993 | Seshardi et al. | ........... | 371/43 |
| 5,237,424 A | 8/1993 | Nishino et al. | ........... | 358/310 |
| 5,241,381 A | 8/1993 | Kondo | ........... | 358/133 |
| 5,243,428 A | 9/1993 | Challapali et al. | ........... | 358/141 |
| 5,247,363 A | 9/1993 | Sun et al. | ........... | 358/167 |
| 5,258,835 A | 11/1993 | Kato | ........... | 358/135 |
| 5,307,175 A | 4/1994 | Seachman | ........... | 358/401 |
| 5,327,502 A | 7/1994 | Kato et al. | ........... | 382/56 |
| 5,337,087 A | 8/1994 | Mishima | ........... | 348/405 |
| 5,359,694 A | 10/1994 | Concordel | ........... | 358/445 |
| 5,379,072 A | 1/1995 | Kondo | ........... | 348/441 |
| 5,398,078 A | 3/1995 | Masuda et al. | ........... | 348/699 |
| 5,400,076 A | 3/1995 | Iwamura | ........... | 348/416 |
| 5,406,334 A | 4/1995 | Kondo et al. | ........... | 348/581 |
| 5,416,651 A | 5/1995 | Uetake et al. | ........... | 360/48 |
| 5,416,847 A | 5/1995 | Boze | ........... | 381/94 |
| 5,428,403 A | 6/1995 | Andrew et al. | ........... | 348/699 |
| 5,434,716 A | 7/1995 | Sugiyama et al. | ........... | 360/32 |
| 5,438,369 A | 8/1995 | Citta et al. | ........... | 348/470 |
| 5,446,456 A | 8/1995 | Seo | ........... | 341/118 |
| 5,455,629 A | 10/1995 | Sun et al. | ........... | 348/466 |
| 5,469,216 A | 11/1995 | Takahashi et al. | ........... | 348/441 |
| 5,469,474 A | 11/1995 | Kitabatake | ........... | 375/243 |
| 5,471,501 A | 11/1995 | Parr et al. | ........... | 375/354 |
| 5,473,479 A | 12/1995 | Takahura | ........... | 360/48 |
| 5,481,554 A | 1/1996 | Kondo | ........... | 371/53 |
| 5,481,627 A | 1/1996 | Kim | ........... | 382/254 |
| 5,495,298 A | 2/1996 | Uchida et al. | ........... | 348/615 |
| 5,499,057 A | 3/1996 | Kondo et al. | ........... | 348/607 |
| 5,528,608 A | 6/1996 | Shimizume | ........... | 371/40.3 |
| 5,557,420 A | 9/1996 | Yanagihara et al. | ........... | 358/335 |
| 5,557,479 A | 9/1996 | Yanagihara | ........... | 360/32 |
| 5,577,053 A | 11/1996 | Dent | ........... | 714/755 |
| 5,594,807 A | 1/1997 | Liu | ........... | 382/128 |
| 5,598,214 A | 1/1997 | Kondo et al. | ........... | 348/414 |
| 5,617,333 A | 4/1997 | Oyamada et al. | ........... | 364/514 |
| 5,625,715 A | 4/1997 | Trew et al. | ........... | 382/236 |
| 5,636,316 A | 6/1997 | Oku et al. | ........... | 386/112 |
| 5,649,053 A | 7/1997 | Kim | ........... | 395/2.38 |
| 5,663,764 A | 9/1997 | Kondo et al. | ........... | 348/414 |
| 5,673,357 A | 9/1997 | Shima | ........... | 386/94 |
| 5,677,734 A | 10/1997 | Oikawa et al. | ........... | 348/405 |
| 5,689,302 A | 11/1997 | Jones | ........... | 348/218 |
| 5,699,475 A | 12/1997 | Oguro et al. | ........... | 386/109 |
| 5,703,889 A | 12/1997 | Shimoda et al. | ........... | 371/55 |
| 5,724,099 A | 3/1998 | Hamdi et al. | ........... | 348/419 |
| 5,724,369 A | 3/1998 | Brailean et al. | ........... | 371/31 |
| 5,737,022 A | 4/1998 | Yamaguchi et al. | ........... | 348/416 |
| 5,751,361 A | 5/1998 | Kim | ........... | 348/409 |
| 5,751,743 A | 5/1998 | Takizawa | ........... | 371/41 |
| 5,751,862 A | 5/1998 | Williams et al. | ........... | 382/260 |
| 5,786,857 A | 7/1998 | Yamaguchi | ........... | 348/405 |
| 5,790,195 A | 8/1998 | Ohsawa | ........... | 348/419 |
| 5,796,786 A | 8/1998 | Lee | ........... | 375/326 |
| 5,805,762 A | 9/1998 | Boyce et al. | ........... | 386/68 |
| 5,809,041 A | 9/1998 | Shikakura et al. | ........... | 371/31 |
| 5,809,231 A | 9/1998 | Yokoyama et al. | ........... | 395/250.3 |
| 5,852,470 A | 12/1998 | Kondo et al. | ........... | 348/448 |
| 5,861,922 A | 1/1999 | Murashita et al. | ........... | 348/420 |
| 5,878,183 A | 3/1999 | Sugiyama et al. | ........... | 386/96 |
| 5,896,466 A | 4/1999 | Kim | | |
| 5,903,481 A | 5/1999 | Kondo et al. | ........... | 364/724.1 |
| 5,928,318 A | 7/1999 | Araki | ........... | 708/650 |
| 5,936,674 A | 8/1999 | Kim | ........... | 348/420 |
| 5,946,044 A | 8/1999 | Kondo et al. | ........... | 348/458 |
| 6,067,636 A | 5/2000 | Yao et al. | ........... | 714/15 |
| 6,137,915 A | 10/2000 | Chai | ........... | 382/240 |

OTHER PUBLICATIONS

Chu, et al., "Detection and Concealment of Transmission Errors in H.261 Images", XP–000737027, pp. 74–84, IEEE 1998.

Park, et al., "Recovery of Block–coded Images From Channel Errors", XP–000371122, pp. 396–400, Pub. Date May 23, 1993.

International Search Report PCT/US00/03738, Feb. 11, 2000, 9 pgs.

Stammnitz, et al., "Digital HDTV Experimental System", pp. 535–542.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

International Search Report PCT/US00/03439, Feb. 9, 2000, 8 pgs.

International Search Report PCT/US00/03595, Feb. 10, 2000, 6 pgs.

International Search Report PCT/US00/03611, Feb. 10, 2000, 8 pgs.

International Search Report PCT/US00/03599, Feb. 10, 2000, 4 pgs.

International Search Report PCT/US00/03742, Feb. 11, 2000, 5 pgs.

International Search Report PCT/US00/03654, Feb. 10, 2000, 4 pgs.

International Search Report PCT/US00/03299, Feb. 9, 2000, 5 pgs.

Meguro, et al., "An Adaptive Order Statistics Filter Based On Fuzzy Rules For Image Processing", pp. 70–80, XP–00755627, 1997 Scripta Technica, Inc.

Japanese Patent No. 05304659 and translation of Abstract, HO4N 7/13.

Japanese Patent No. 05244578 and translation of Abstract, HO4N 7/13.

Japanese Patent No. 05300485 and translation of Abstract, H04N 7/13.
Japanese Patent No. 06070298 and translation of Abstract, H04N 7/13.
Japanese Patent No. 06006778 and translation of Abstract, H04N 7/13.
Japanese Patent No. 06113256 and translation of Abstract, H04N 5/92.
Japanese Patent No. 06113275 and translation of Abstract, H04N 7/13.
Japanese Patent No. 06253287 and translation of Abstract, H04N 7/137.
Japanese Patent No. 06253280 and translation of Abstract, H04N 7/133.
Japanese Patent No. 06253284 and translation of Abstract, H04N 7/133.
Japanese Patent No. 06350981 and translation of Abstract, H04N 7/13.
Japanese Patent No. 06350982 and translation of Abstract, H04N 7/13.
Japanese Patent No. 08317394 and translation of Abstract, H04N 7/30.
Japanese Patent No. 07023388 and translation of Abstract, H04N 7/30.
Japanese Patent No. 04245881 and translation of Abstract, H04N 5/92.
Japanese Patent No. 04115628 and translation of Abstract, H03N 7/40.
Japanese Patent No. 04115686 and translation of Abstract, H04N 7/13.
Translation of Abstract of Japanese Patent No. 61147690. H04N 7/13.
Translation of Abstract of Japanese Patent No. 63256080.. H04N 7/13.
Translation of Abstract of Japanese Patent No. 63257390. H04N 7/13.
Translation of Abstract of Japanese Patent No. 02194785. H04N 7/13.
Translation of Abstract of Japanese Patent No. 03024885. H04N 7/13.
Translation of Abstract of Japanese Patent No. 04037293. H04N 9/80.
Translation of Abstract of Japanese Patent No. 04316293. H04N 7/13.
Translation of Abstract of Japanese Patent No. 04329088. H04N 7/13.
Translation of Abstract of Japanese Patent No. 05047116. H04N 5/92.
Translation of Abstract of Japanese Patent No. 05244579. H04N 7/133.
Translation of Abstract of Japanese Patent No. 05244580. H04N 7/133.
Translation of Abstract of Japanese Patent No. 05244559. H04N 5/92.
Translation of Abstract of Japanese Patent No. 05304659. H04N 7/13.
Translation of Abstract of Japanese Patent No. 06086259. H04N 7/133.
Translation of Abstract of Japanese Patent No. 06113258. H04N 5/92.
Translation of Abstract of Japanese Patent No. 06125534. H04N 7/13.
Translation of Abstract of Japanese Patent No. 06162693. G11B 20/18.
Translation of Abstract of Japanese Patent No. 06253287. H04N 7/137.
Translation of Abstract of Japanese Patent No. 06253280. H04N 7/133.
Translation of Abstract of Japanese Patent No. 06253284. H04N 7/133.
Translation of Abstract of Japanese Patent No. 07046604. H04N 7/32.
Translation of Abstract of Japanese Patent No. 07085611. G11B 20/18.
Translation of Abstract of Japanese Patent No. 07095581. H04N 7/30.
Translation of Abstract of Japanese Patent No. 07177505. H04N 7/24.
Translation of Abstract of Japanese Patent No. 07177506. H04N 7/24.
Translation of Abstract of Japanese Patent No. 07240903. H04N 7/015.
International Search Report, PCT/US98/22412, Oct. 5, 1999, 5 pgs.
R.C. Gonzalez, et al., "Digital Image Processing", Addison Wesley Publishing Compant, Inc., 1992, pp. 346–348.
R. Aravind, et al., "Image and Video Coding Standards", AT&T Technical Journal, Jan./Feb. 1993, pp. 67–88.
Zhu, et al., "Coding and Cell–Loss Recovery in DCT–Based Packet Video", IEEE Transactions on Circuits and Systems for Video Technology, Jun. 3, 1993, No. 3, NY.
International Search Report, PCT/US98/22347, Mar. 16, 1999, 2 pgs.
International Search Report, PCT/US95/22531, Apr. 1, 1999, 1 pg.
International Search Report, PCT/US98/22411, Feb. 25, 1999, 1 pg.
Knodo, et al., "Adaptive Dynamic Range Coding Scheme for Future HDTV Digital VTR", Fourth International Workshop on HDTV and Beyond, Sep. 4–6, Turin, Italy.
Kondo, et al., "A New Concealment Method for Digital VCR's", IEEE Visual Signal Processing and Communication, pp. 20–22, Sep. 1993, Melbourne, Australia.
Park, et al., "A Simple Concealment for ATM Bursty Cell Loss", IEEE Transactions on Consumer Electronics, No. 3, Aug. 1993, pp. 704–709.
Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.
NHK Laboratories Note,"Error Correction, Concealment and Shuffling", No. 424, Mar. 1994, pp. 29–44.
Translation of Japanese Patent #7–67028, 30 pgs.
Kondo, et al., "Adaptive Dynamic Range Coding Scheme for Future Consumer Digital VTR", pp. 219–226.
Kim, et al., "Bit Rate Reduction Algorithm for a Digital VCR", IEEE Transactions on Consumer Electronics, vol. 37, No. 3, Aug. 1, 1992, pp. 267–274.

* cited by examiner

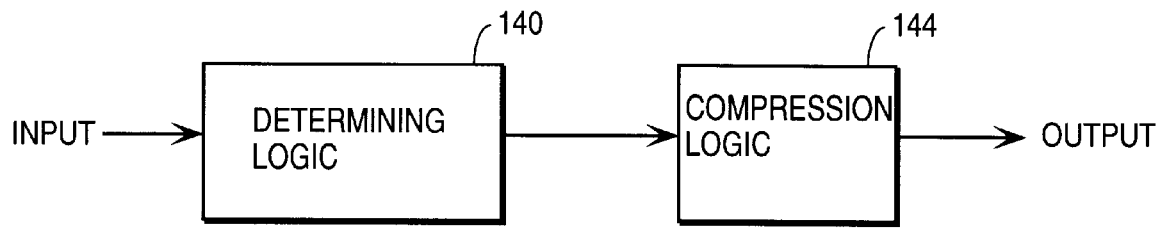
Fig. 1D   ENCODER
Fig. 1E   DECODER

METHOD AND APPARATUS FOR RECOVERY OF ENCODED DATA USING CENTRAL VALUE

BACKGROUND OF THE INVENTION

1. Field of the Invention

The present invention relates to encoding of data to provide for robust error recovery due to data losses typically incurred during transmission or storage of signals.

2. Art Background

A number of techniques exist for reconstructing lost/damaged data due to random errors that may occur during signal transmission or storage. However, these techniques are limited at handling the loss of consecutive packets of data. Consecutive loss of packets of data is described in the art as burst error. Burst errors may result in a reconstructed signal with such a degraded quality that it is easily apparent to the end user.

Additionally, compression methodologies used to facilitate high speed communications compound the signal degradation caused by burst errors, thus adding to the degradation of the reconstructed signal. Examples of burst error loss affecting transmitted and/or stored signals is seen in high definition television ("HDTV") signals, mobile telecommunication applications, as well as video storage technologies including compact disc (CD), video disk (e.g., DVD), and video cassette recorders (VCRs).

In one application, the advent of HDTV has led to television systems with a much higher resolution than the current standards proposed by the National Television Systems Committee ("NTSC"). Proposed HDTV signals are predominantly digital. Accordingly, when a color television signal is converted for digital use the luminance and chrominance signals can be digitized using eight bits. Digital transmission of NTSC color television so encoded requires a nominal bit rate of about two hundred and sixteen megabits per second. The transmission rate is greater for HDTV which would nominally require about 1200 megabits per second. Such high transmission rates are well beyond the bandwidths supported by current wireless standards. Accordingly, an efficient compression methodology is required.

Compression methodologies also play an important role in mobile telecommunication applications. Typically, packets of data are communicated between remote terminals in mobile telecommunication applications. The limited number of transmission channels in mobile communications requires an effective compression methodology prior to the transmission of packets. A number of compression techniques are available to facilitate high transmission rates.

Adaptive Dynamic Range Coding ("ADRC") and Discrete Cosine Transform ("DCT") coding provide image compression techniques known in the art. Both techniques take advantage of the local correlation within an image to achieve a high compression ratio. However, an efficient compression algorithm can result in compounded error propagation because errors in an encoded signal are more prominent when subsequently decoded. This error multiplication can result in a degraded video image that is readily apparent to the user.

SUMMARY OF THE INVENTION

The present invention provides a method for compressing data by determining a central value that is greater than the minimum value and less than the maximum value of the range of data. In one embodiment, the central value is chosen to be a value that substantially reduces a decoding error in the event that the range of values is subsequently estimated. In one embodiment, the central value is the value that minimizes the expected mean square error during reconstruction when there is an error. In one embodiment, the maximum and minimum values represent intensity data for pixels of an image. In another embodiment, the compression process is Adaptive Dynamic Range Coding, and the central value is a value within the dynamic range, excluding the maximum and minimum values.

BRIEF DESCRIPTION OF THE DRAWINGS

The objects, features and advantages of the present invention will be apparent from the following detailed description in which:

FIGS. 1D and 1E show embodiments of the present invention implemented as hardware logic.

DETAILED DESCRIPTION

The present invention provides a method for coding and arranging a signal stream to provide for a robust error recovery and methods for performing error recovery. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The following is described in the context of Adaptive Dynamic Range Coding (ADRC) encoded video images, and more particularly the recovery of lost or damaged (lost/damaged) compression parameters such as dynamic range (DR). However, it is contemplated that the present invention is not limited to video, not limited to ADRC encoding, and not limited to the particular compression parameters generated. Rather, it will be apparent that the present invention is applicable to different compression technologies, and different types of correlated data, including, but not limited to, two-dimensional static images, hologram images, three-dimensional static images, video, two-dimensional moving images, three dimensional moving images, monaural sound, and N-channel sound. The present invention is also applicable to different compression parameters including, but not limited to, the central value (CEN) which may be used in ADRC processes. In addition, the present invention is applicable to different types of ADRC processes including edge-matching and non edge-matching ADRC. For further information regarding ADRC, see "Adaptive Dynamic Range Coding Scheme for Future HDTV Digital VTR", Kondo, Fujimori, Nakaya, Fourth International Workshop on HDTV and Beyond, Sep. 4–6, 1991, Turin, Italy.

Figure 1A:
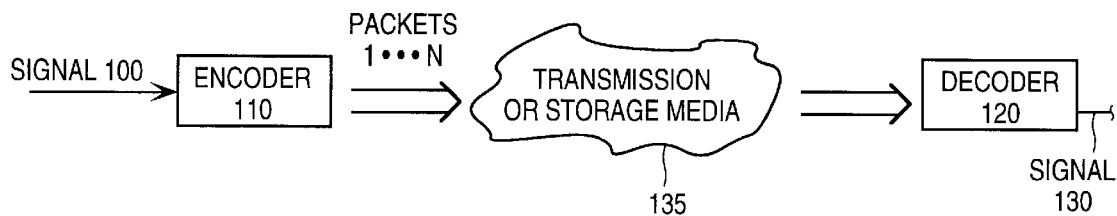
FIG. 1A shows an embodiment of the signal encoding, transmission, and subsequent decoding processes.

The signal encoding, transmission, and subsequent decoding processes are generally illustrated in FIG. 1A. Signal 100 is a data stream input to Encoder 110.

Encoder 110 can follow the Adaptive Dynamic Range Coding ("ADRC") compression algorithm and generate Packets 1, . . . N for transmission along transmission Media 135. Decoder 120 receives Packets 1, . . . N from Transmission Media 135 and generates Signal 130. Signal 130 is a reconstruction of Signal 100.

Figure 1B:
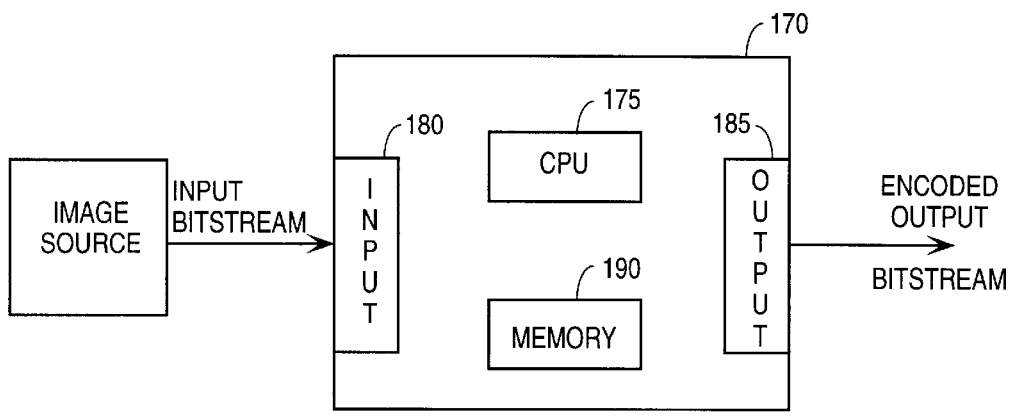
FIGS. 1B and 1C show embodiments of the present invention implemented as software executed by a processor.
Figure 1C:
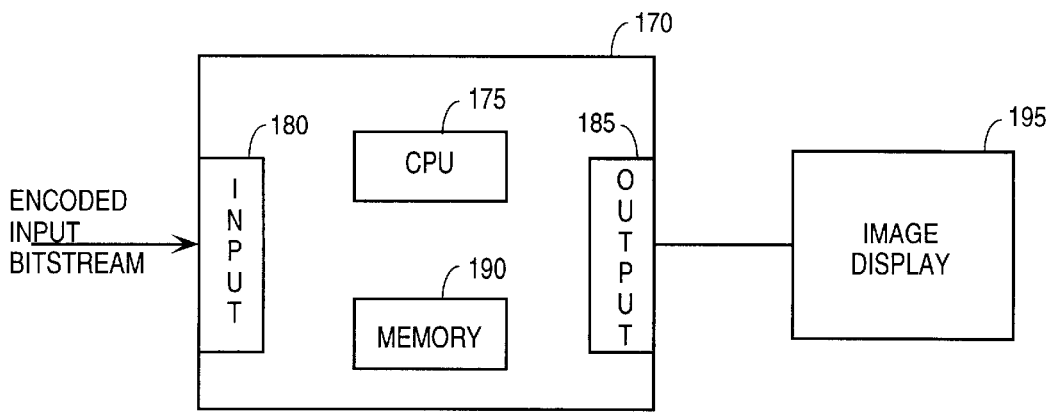

Encoder 110 and Decoder 120 can be implemented a variety of ways to perform the functionality described herein. In one embodiment, Encoder 110 and/or Decoder 120 are embodied as software stored on media and executed by a general purpose or specifically configured computer or data processing system, typically including a central processing unit, memory and one or more input/output devices and co-processors, as shown in FIGS. 1B and 1C. Alternately, the Encoder 110 and/or Decoder 120 may be implemented as logic to perform the functionality described herein, as shown in FIGS. 1D and 1E. In addition, Encoder 110 and/or Decoder 120 can be implemented as a combination of hardware, software or firmware.

Embodiments of circuits for encoding and recovering lost/damaged compression parameters are shown in FIGS. 1B and 1C. The methods described herein can be implemented on a specially configured or general purpose processor system 170. Instructions are stored in the memory 190 and accessed by the processor 175 to perform many of the steps described herein. An input 180 receives the input bitstream and forwards the data to the processor 175. The output 185 outputs the data. In FIG. 1B, the output may consist of the encoded data. In FIG. 1C, the output may consist of the decoded data, such as image data decoded once the compression parameter is recovered, sufficient to drive an external device such as display 195.

In another embodiment, the output 185 outputs the recovered compression parameter. The recovered compression parameter is then input to other circuitry to generate the decoded data.

An alternate embodiment of the circuits for encoding compression parameters and recovering lost/damaged compression parameters are shown in FIGS. 1D and 1E. The methods described herein may be implemented in specially configured logic, such as Application Specific Integrated Circuits (ASIC), large scale integration (LSI) logic, a programmable gate array, or one or more processors.

Figure 2:
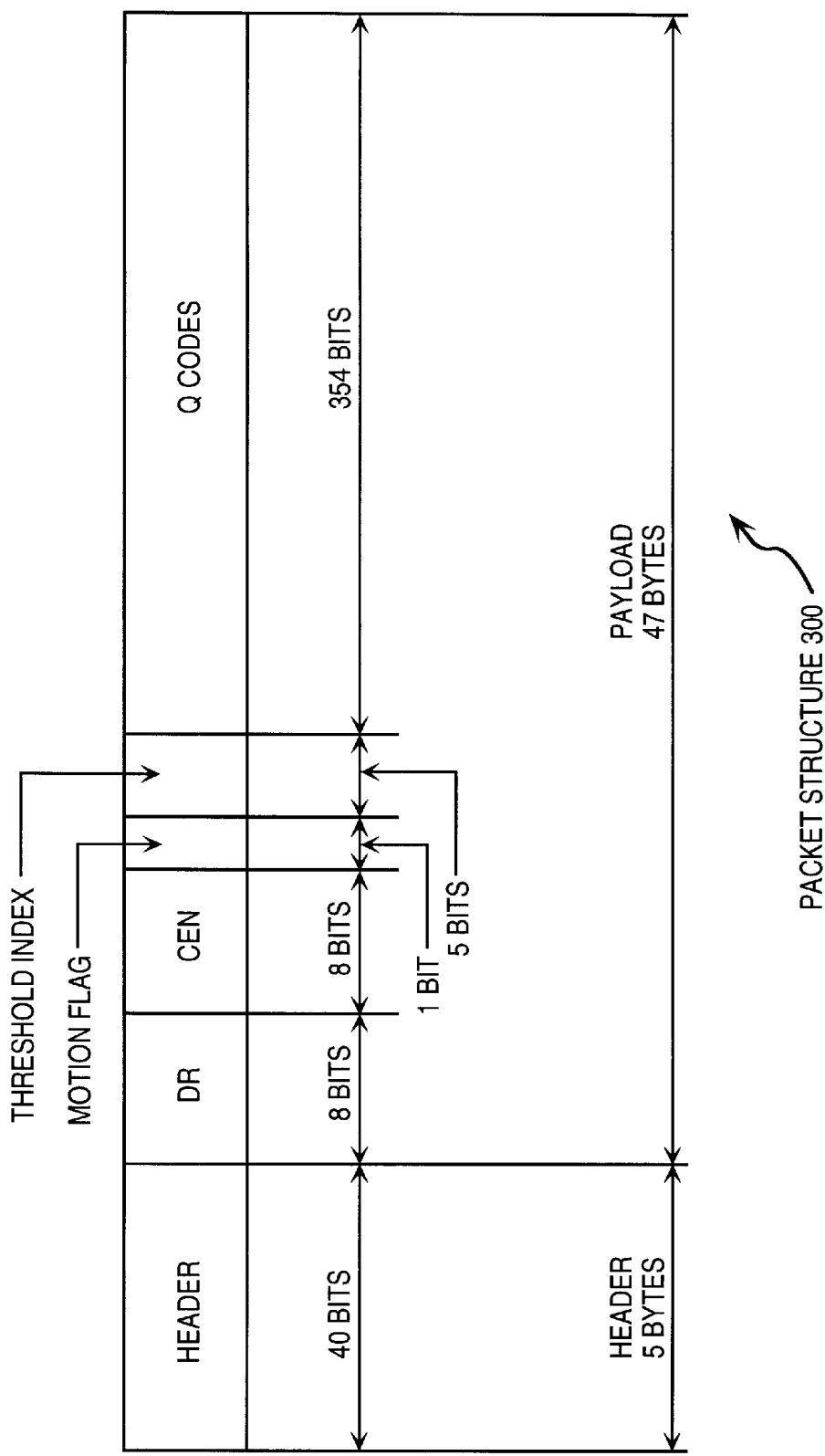
FIG. 2 illustrates an embodiment of a packet structure.

FIG. 2 illustrates one embodiment of data structure or packet structure 300 used for the transmission of the data across point-to-point connections as well as networks. Packet structure 300 is generated by encoder 110 and is transmitted across transmission/storage media 135. For one embodiment, packet structure 300 comprises five bytes of header information, eight DR bits, eight CEN bits, a motion flag bit, a five bit threshold index, and 354 bits of Q codes. The packet structure described herein is illustrative and may typically be implemented for transmission in an asynchronous transfer mode ("ATM") network. However, the present invention is not limited to the packet structure described and a variety of packet structures that are used in a variety of networks can be utilized.

In one embodiment, data structure 300 is stored in a computer readable memory, so that data structure 300 can be accessed by a program being executed on a data processing system. The data structure 300 stored in the memory includes a dynamic range data object (DR) and a central value data object (CEN) associated with the dynamic range data object. The central value data object has a value that is greater than a minimum value of the dynamic range data object, and less than a maximum value of the dynamic range data object. The central value data object substantially reduces a decoding error in the event that the dynamic range data object is estimated. Each data structure 300 may be a packet structure.

As noted above, the exemplary system and apparatus described above may be used to encode images, such as video or moving images, using ADRC. ADRC has been established as a feasible real-time technique for coding and compressing images in preparation for constant bit-rate transmission.

The discrete data points that make up a digital image are known as pixels. Each pixel may be represented independently using 8 bits, but other representations can also be used for the purposes of compression or analysis. Many representations begin by dividing this raw data into disjoint sets. For historical reasons, these sets, which may be composed of one or more pieces of data or pixels, are referred to as "blocks", even though they may not have a traditional block shape. The data may then be characterized by compression parameters. In one embodiment, these compression parameters include block parameters and bitstream parameters.

A block parameter includes data that describes how an image looks. The block parameter therefore may be used to define one or more attributes of a block. For example, in ADRC, block-wide information can include the minimum pixel value (MIN), the maximum pixel value (MAX), the central pixel value (CEN), the dynamic range of the pixel values (DR), or any combination of these values.

A bitstream parameter may include data that describes how an image is encoded. In one embodiment, a bitstream parameter may indicate the number of bits used to encode data. For example, in ADRC, the bitstream parameters may include Qbit and motion flag (MF) values. In this embodiment, the bitstream parameter therefore can indicate how the data is encoded that represents where a pixel value lies within the range specified by the global information.

In one example in which ADRC encoding is used, the block data is comprised of the MIN, DR and Qbit number (defined below), and the pixel data is comprised of Qcodes. DR may be defined as MAX−MIN or MAX−MIN+1. In the present embodiment, as will be explained below, CEN may be defined as a value between MIN and MAX. For example, CEN may be equal to MIN+DR/2.

A Q code is an integer in the range $[0, 2^Q-1]$ that identifies one value in the set {MIN, MIN+1, . . . , CEN, . . . , MAX}. Since the Qbit number, Q, is generally small and the DR value may be relatively large, it is generally not possible to represent all pixel values exactly. Therefore, some quantization error is introduced when pixel values are reduced to Qcode values. For instance, if the Qbit number is 3, then it is generally possible to represent $2^3=8$ values from the set {MIN, MIN+1, . . . , CEN, . . . , MAX} without any error. Pixels with other values are rounded to one of these eight values. This rounding introduces quantization error.

Temporal compression is feasible for a sequence of like images spanning more than one instance in time. An image frame is defined as the 2-dimensional collection of pixels arising within a given time period. It is well known that data from corresponding locations of temporally close image frames is likely to contain similar values. When this is true, compression is improved by encoding each of these like values only once.

In a second example, multiple image frames are encoded by adding a motion flag (MF) to the block information of the first example. This MF indicates whether or not data from each frame is encoded using separate Qcodes. If no motion is indicated, the same Qcodes are used to represent each frame of data. If motion is indicated, then separate Qcodes are used to encode each frame.

Two methods of ADRC coding can be used: non-edge-matching ADRC, and edge matching ADRC. These methods differ in the precise formula used to generate the quantization code (Qcode) value. On the other hand, the methods have much in common. Both methods begin by segmenting the image into blocks, and then determining the maximum (MAX) and minimum (MIN) pixel value for each block. In 2D ADRC, one quantization code (Qcode) value is determined for each pixel. In 3D ADRC, a motion flag (MF) value (1 if motion, 0 otherwise) is determined for each block. When the motion flag is 1, a unique Qcode can be determined for each block. When the motion flag is 0, then corresponding pixel values can be averaged for each block, the block parameter values are updated accordingly, and a single Qcode can be determined that will represent the corresponding pixels from each frame.

Non-edge-matching ADRC can define the DR value as $$DR = MAX - MIN + 1 \quad (1)$$

and a quantization code as $$q_i = \left\lfloor \frac{2^Q (x_i - MIN + 1/2)}{DR} \right\rfloor \quad (2)$$

where Q is the number of quantization bits, and $x_i$ is the original pixel value (or averaged pixel value, in the case of non-motion blocks in 3D ADRC). Pixel values can be reconstructed or recovered according to the following formula:

$$x'_i = \left\lfloor MIN + \frac{DR(q_i + 1/2)}{2^Q} \right\rfloor \quad (3)$$

where MAX represents the maximum level of a block, MIN represents the minimum level of a block, Q represents the number of quantization bits, $q_i$ represents the quantization code (encoded data), $x'_i$ represents the decoded level of each sample, and where it is expected that $x'_i \approx x_i$.

Edge-matching ADRC can define the DR value as $$DR = MAX - MIN \quad (4)$$

and a quantization code as $$q_i = \left\lfloor \frac{(2^Q - 1)(x_i - MIN)}{DR} + 1/2 \right\rfloor \quad (5)$$

where Q is the number of quantization bits, and $x_i$ is the original pixel value (or averaged pixel value, in the case of non-motion blocks in 3D ADRC). Pixel values can be reconstructed or recovered according to the following formula:

$$x'_i = \left\lfloor MIN + \frac{DR(q_i)}{2^Q - 1} + 1/2 \right\rfloor \quad (6)$$

where MAX represents the maximum level of a block, MIN represents the minimum level of a block, Q represents the number of quantization bits, $q_i$ represents the quantization code (encoded data), $x'_i$ represents the decoded level of each sample, and where it is expected that $x'_i \approx x_i$.

Although the exemplary quantization code and reconstruction formulae above for ADRC uses the MIN value, any value greater than or equal to MIN, and less than or equal to MAX, may be used, along with DR, to encode and decode pixel values. For both edge matching and non-edge matching ADRC, the DR value may be lost during transmission. If DR is lost, then pixel values are reconstructed using an estimate for DR.

Figure 3B:
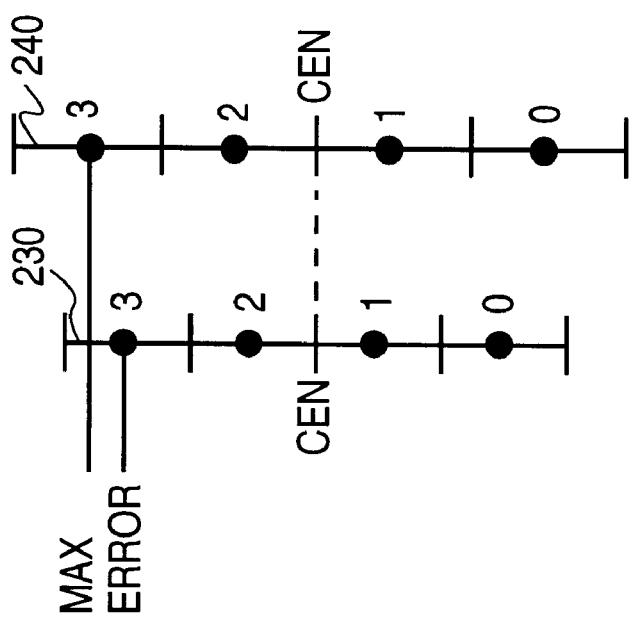
FIGS. 3A and 3B show the difference between the actual and recovered Qcode levels when the dynamic range (DR) is overestimated according to one embodiment.
Figure 3A:
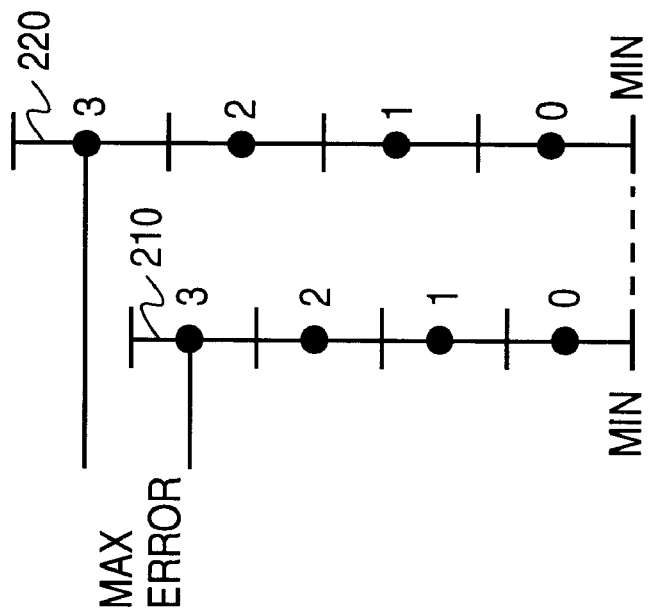

The maximum decoding error when DR is overestimated (or underestimated) is related to the value, e.g., block parameter, that is used to encode and decode the pixel values. FIGS. 3A and 3B illustrate the difference between the actual and recovered Qcode levels when the DR is overestimated by 20%.

For example, FIG. 3A shows the maximum decoding error when DR is overestimated by 20% and the MIN value is used to encode and decode. FIG. 3B shows the maximum decoding error when DR is overestimated by 20%, and the CEN value is used. The maximum decoding error for FIG. 3B, which uses CEN, is much less than the maximum decoding error shown in FIG. 3A, which uses MIN.

The axis 210 on the left of FIG. 3A illustrates the proper recovery of Qcodes in a 2-bit ADRC block, using non-edge-matching ADRC. The right axis 220 shows the Qcodes which are recovered if the DR is overestimated by 20%. As indicated, the maximum decoding error is realized for the largest Qcode value. (A similar result occurs when the DR is underestimated.)

The performance illustrated in FIG. 3A may be compared to that illustrated in FIG. 3B which uses a Central Value in place of MIN. Assuming the same DR estimation error is realized, the maximum recovery error has been halved using CEN. Furthermore, the expected mean-square error has also been reduced, providing a corresponding increase in the signal-to-noise ratio (SNR) of the recovered signal. Thus, by using CEN, the recovery of Qcodes for the encoding, transmission, and decoding of image data can be enhanced and both the mean square decoding error and the maximum decoding error in the event of DR estimation error can be substantially reduced, and even minimized.

The central value may be selected as a value that substantially reduces, and even minimizes, the expected mean square error for reconstruction when DR is estimated, and has a constant DR estimation error. This value may be determined by the following process.

A general form of the ADRC decoding equation without truncation error is:

$$x'_i = MIN + \frac{DR z_i}{M} + K \quad (7)$$

where values for $z_i$, M and K are provided in Table 1. The general form of Eq. (7) both simplifies the ADRC notation and allows for simultaneous derivation of formulas for non-edge-matching and edge-matching ADRC.

TABLE 1

Values of the terms used in the generalized decoding equation

| Term | Non-edge-matching ADRC | Edge-matching ADRC |
|---|---|---|
| $z_i$ | $q_i + \frac{1}{2}$ | $q_i$ |
| M | $2^Q$ | $2^Q - 1$ |
| K | 0 | $\frac{1}{2}$ |

If instead of transmitting the MIN value, some other value is transmitted and the DR value is strictly positive, the other value may be expressed as:

$$VAL = MIN + \alpha DR \qquad (8)$$

where $\alpha$ is a constant. The ADRC decoding equation may therefore be:

$$x'_i = VAL - \alpha DR + \frac{DR z_i}{M} + K \qquad (9)$$

Let $DR_e$ represent erroneous estimate of the dynamic range. The erroneous decoding may be represented as:

$$x'_{error(i)} = VAL - \alpha DR_e + \frac{DR_e z_i}{M} + K \qquad (10)$$

where $x_{error(i)}$ represents an erroneous decoding, and so the decoding error $error_i = x_i - x_{error(i)}$ can be written:

$$error_i = (DR - DR_e)\left[\frac{z_i}{M} - \alpha\right] \qquad (11)$$

Therefore, the mean square error (MSE) may be expressed as a function of $\alpha$:

$$MSE(\alpha) = \frac{1}{N}\sum_{i=1}^{N}(error_i)^2 \qquad (12)$$

$$= \frac{1}{N}(DR - DR_e)^2 \sum_{i=1}^{N}\left[\frac{z_i}{M} - \alpha\right]^2 \qquad (13)$$

$$= \frac{1}{N}(DR - DR_e)^2 \left(\frac{1}{M}\right)^2 \sum_{i=1}^{N}[z_i^2 - 2z_i M\alpha + M^2\alpha^2] \qquad (14)$$

where errors represents the decoding error, N represents the number of erroneously decoded pixels, and $\alpha$ is a non-negative real number.

The expected mean square error may be expressed as a function of $\alpha$ to optimize over $\alpha$:

$$E(MSE(\alpha)) = \frac{1}{N}(DR - DR_e)^2 \left(\frac{1}{M}\right)^2 \sum_{i=1}^{N}[E(z_i^2) - 2E(z_i)M\alpha + M^2\alpha^2] \qquad (15)$$

$$= (DR - DR_e)^2 \left(\frac{1}{M}\right)^2 [E(z_i^2) - 2E(z_i)M\alpha + M^2\alpha^2] \qquad (16)$$

where MSE ($\alpha$) represents the mean square error expressed as a function of $\alpha$, and E represents the expected mean square error.

The conditions for minimization can be checked by computing the first and second derivatives:

$$E'(MSE(\alpha)) = (DR - DR_e)^2 \left(\frac{1}{M}\right)^2 [-2E(z_i)M + 2M^2\alpha] \qquad (17)$$

$$E''(MSE(\alpha)) = (DR - DR_e)^2 \left(\frac{1}{M}\right)^2 [2M^2] \qquad (18)$$

From Eq. (18), the second derivative is strictly positive whenever $DR_e \neq DR$; therefore the point at which $E'(MSE(\alpha))=0$ is the global minimum. This may be achieved if:

$$2M^2\alpha = 2E(z_i)M \qquad (19)$$

Eq. (19) therefore implies that:

$$\alpha = \frac{E(z_i)}{M} \qquad (20)$$

Assuming a uniform distribution of Qcode values, the expected values may be:

$$E(q_i) = \sum_{q=0}^{2^Q - 1}\left(\frac{1}{2^Q}\right)q = \frac{2^Q - 1}{2} \qquad (21)$$

Thus, in the case of non-edge-matching ADRC Eq. (20) may become:

$$\alpha = \frac{E(q_i + \frac{1}{2})}{2^Q} = \frac{\frac{2^Q - 1}{2} + \frac{1}{2}}{2^Q} = \frac{1}{2} \qquad (22)$$

Similarly for edge-matching ADRC, Eq. (20) may become:

$$\alpha = \frac{E(q_i)}{2^Q - 1} = \frac{\frac{2^Q - 1}{2}}{2^Q - 1} = \frac{1}{2} \qquad (23)$$

Substituting $\alpha = \frac{1}{2}$ back into Eq. (8), the optimal value to transmit may be:

$$VAL = MIN + DR/2 = CEN \qquad (24)$$

for either non-edge-matching ADRC or edge-matching ADRC.

Although this derivation assumed a uniform distribution of Qcode values, a non-uniform distribution which favors Qcode values near the middle of the region also supports the use of the CEN value.

The benefit of transmitting the CEN value can be quantified using Eq. (16) and substituting $\alpha=0$ so that VAL=MIN and $\alpha=\frac{1}{2}$ so that VAL=CEN.

Assuming a uniform distribution of Qcode values, $E(q_i^2)$ may be calculated as:

$$E(q_i^2) = \sum_{q=0}^{2^Q - 1}\left(\frac{1}{2^Q}\right)q^2 = \frac{(2^Q - 1)(2^{Q+1} - 1)}{6} \qquad (25)$$

The ratio of the mean square errors for CEN value decoding to the mean square errors for MIN value decoding is tabulated in Table 2 for various Qbit values Q:

$$MSE \text{ reduction ratio} = \tag{26}$$

$$\frac{E(MSE \text{ for } CEN \text{ decoding})}{E(MSE \text{ for } MIN \text{ decoding})} = \frac{E(z_i^2) - E(z_i)M + \frac{1}{4}M^2}{E(z_i^2)}$$

TABLE 2

The ratio of the E(MSE) for CEN value decoding to the E(MSE) for MIN value decoding versus the Qbit value Q.

| | MSE reduction ratio | |
|---|---|---|
| Q | Non-edge-matching ADRC | Edge-matching ADRC |
| 1 | 0.200 | 0.500 |
| 2 | 0.238 | 0.357 |
| 3 | 0.247 | 0.300 |
| 4 | 0.249 | 0.274 |
| 4 | 0.250 | 0.262 |
| 6 | 0.250 | 0.256 |
| 7 | 0.250 | 0.253 |

The reduction in mean square error for DR recovery assuming some common types of ADRC encoding is therefore quantified. Thus, the CEN value is the mean square optimal counterpart of DR in ADRC transmission subject to DR loss. This type of encoding is referred to herein as Central Value ADRC.

In Central Value ADRC, the central value (CEN) can be transmitted in place of the MIN value. In one embodiment, as discussed above, the CEN value may be defined as $$CEN = MIN + \left\lfloor \frac{DR}{2} \right\rfloor \tag{27}$$

In this embodiment, the reconstruction formulas for $x'_i$ may be found by substituting MIN=CEN−DR/2 in Eqs. (3) and (6). That is, for non-edge-matching ADRC:

$$x'_i = \left\lfloor CEN + \frac{DR}{2^Q}(q_i + \frac{1}{2} - 2^{Q-1}) \right\rfloor \tag{28}$$

and in the case of edge-matching ADRC:

$$x'_i = \left\lfloor CEN + \frac{1}{2} + DR\left(\frac{q_i}{2^Q - 1} - \frac{1}{2}\right) \right\rfloor \tag{29}$$

In the error-free case, the performance of Central Value ADRC using CEN is similar to ADRC using a MIN value. However, in the presence of DR loss, Central Value ADRC may provide better lost/damaged data recovery performance compared with the MIN value ADRC.

The invention has been described in conjunction with a preferred embodiment. It is evident that numerous alternatives, modifications, variations and uses will be apparent to those skilled in the art in light of the foregoing description.

What is claimed is:

1. A method for encoding data comprising determining a central value for a range of values by selecting a value that is greater than a minimum value of a range of data and less than a maximum value of the range of data and substantially reduces a decoding error in the event that the range of values is subsequently estimated and wherein said encoding is performed on said data using Adaptive Dynamic Range Coding (ADRC), and encoded data includes a quantization code (Qcode) defined according to an equation selected from the group consisting of:

$$q_i = \left\lfloor \frac{(2^Q - 1)(x_i - CEN)}{DR} + 1/2 \right\rfloor; \text{ and}$$

$$q_i = \left\lfloor \frac{2^Q(x_i - CEN + 1/2)}{DR} \right\rfloor$$

where $q_i$ represents a Qcode, Q represents a number of quantization bits, $x_i$ represents the unencoded data, DR represents a dynamic range of data and CEN represents a central value.

2. The method of claim 1, wherein the maximum and minimum values represent information selected from the group consisting of two-dimensional static images, hologram images, three-dimensional static images, video, two-dimensional moving images, three dimensional moving images, monaural sound, and N-channel sound.

3. A method for encoding data comprising determining a central value for a range of values by selecting a value that is greater than a minimum value of a range of data and less than a maximum value of the range of data and substantially reduces a decoding error in the event that the range of values is subsequently estimated and wherein encoding is performed on said data using Adaptive Dynamic Range Coding (ADRC) and recovered data is reconstructed from the encoded data according to an equation selected from the group consisting of:

$$x'_i = \left\lfloor CEN + \frac{1}{2} + DR\left(\frac{q_i}{2^Q - 1} - \frac{1}{2}\right) \right\rfloor; \text{ and}$$

$$x'_i = \left\lfloor CEN + \frac{DR}{2^Q}(q_i + \frac{1}{2} - 2^{Q-1}) \right\rfloor$$

where the $x_i$ represents the recovered data, CEN represents a central value, DR represents a dynamic range of data, $q_i$ represents a Qcode, and Q represents a number of quantization bits.

4. A method for encoding data comprising determining a central value for a range of values by selecting a value that is greater than a minimum value of a range of data and less than a maximum value of the range of data and substantially reduces a decoding error in the event that the range of values is subsequently estimated and wherein encoding is performed using Adaptive Dynamic Range Coding (ADRC) and the central value is defined as:

$$CEN = MIN + \left\lfloor \frac{DR}{2} \right\rfloor$$

where CEN represents the central value, MIN represents a minimum value, and DR represents a dynamic range of data.

5. A method for decoding a bitstream of encoded data comprising recovering a parameter used to encode the encoded data, said parameter recovered using a central value that is greater than a minimum value of a range of data and less than a maximum value of the range of data and substantially reduces a decoding error in the event that the range of values is estimated and wherein decoding is performed on said data using Adaptive Dynamic Range Coding (ADRC) and recovered data is reconstructed from the encoded data according to an equation selected from the group consisting of:

$$x_i' = \left\lfloor CEN + \frac{1}{2} + DR\left(\frac{q_i}{2^Q - 1} - \frac{1}{2}\right)\right\rfloor; \text{ and}$$

$$x_i' = \left\lfloor CEN + \frac{DR}{2^Q}(q_i + \frac{1}{2} - 2^{Q-1})\right\rfloor$$

where the $x_i$ represents the recovered data, CEN represents a central value, DR represents a dynamic range of data, $q_i$ represents a Qcode, and Q represents a number of quantization bits.

6. The method of claim 5, wherein the maximum and minimum values represent information selected from the group comprising two-dimensional static images, hologram images, three-dimensional static images, video, two-dimensional moving images, three dimensional moving images, monaural sound, and N-channel sound.

7. A method for decoding a bitstream of encoded data comprising recovering a parameter used to encode the encoded data, said parameter recovered using a central value that is greater than a minimum value of a range of data and less than a maximum value of the range of data and substantially reduces a decoding error in the event that the range of values is estimated wherein decoding is performed using Adaptive Dynamic Range Coding (ADRC) and the central value is defined as:

$$CEN = MIN + \left\lfloor \frac{DR}{2} \right\rfloor$$

where CEN represents the central value, MIN represents a minimum value, and DR represents a dynamic range of data.

8. A computer readable medium comprising instructions, which when executed by a processing system performs a method for encoding data comprising determining a central value for a range of values by selecting a value that is greater than a minimum value of a range of data and less than a maximum value of the range of data and substantially reduces a decoding error in the event that the range of values is subsequently estimated and wherein the encoding is performed on said data using Adaptive Dynamic Range Coding (ADRC), and encoded data includes a quantization code (Qcode) defined according to an equation selected from the group consisting of:

$$q_i = \left\lfloor \frac{(2^Q - 1)(x_i - CEN)}{DR} + 1/2 \right\rfloor; \text{ and}$$

$$q_i = \left\lfloor \frac{2^Q(x_i - CEN + 1/2)}{DR} \right\rfloor$$

where $q_i$ represents a Qcode, Q represents a number of quantization bits, $x_i$ represents the unencoded data, DR represents a dynamic range of data and CEN represents a central value.

9. The computer readable medium of claim 8, wherein the maximum and minimum values represent information selected from the group comprising two-dimensional static images, hologram images, three-dimensional static images, video, two-dimensional moving images, three dimensional moving images, monaural sound, and N-channel sound.

10. A computer readable medium comprising instructions, which when executed by a processing system performs a method for encoding data comprising determining a central value for a range of values by selecting a value that is greater than a minimum value of a range of data and less than a maximum value of the range of data and substantially reduces a decoding error in the event that the range of values is subsequently estimated wherein the encoding is performed on said data using Adaptive Dynamic Range Coding (ADRC) and recovered data is reconstructed from the encoded data according to an equation selected from the group consisting of:

$$x_i' = \left\lfloor CEN + \frac{1}{2} + DR\left(\frac{q_i}{2^Q - 1} - \frac{1}{2}\right)\right\rfloor; \text{ and}$$

$$x_i' = \left\lfloor CEN + \frac{DR}{2^Q}(q_i + \frac{1}{2} - 2^{Q-1})\right\rfloor$$

where the $x_i$ represents the recovered data, CEN represents a central value, DR represents a dynamic range of data, $q_i$ represents a Qcode, and Q represents a number of quantization bits.

11. A computer readable medium comprising instructions, which when executed by a processing system performs a method for encoding data comprising determining a central value for a range of values by selecting a value that is greater than a minimum value of a range of data and less than a maximum value of the range of data and substantially reduces a decoding error in the event that the range of values is subsequently estimated wherein encoding is performed using Adaptive Dynamic Range Coding (ADRC) and the central value is defined as:

$$CEN = MIN + \left\lfloor \frac{DR}{2} \right\rfloor$$

where CEN represents the central value, MIN represents a minimum value, and DR represents a dynamic range of data.

12. A system configured to encode data comprising a central value for a range of values that is greater than a minimum value of a range of data and less than a maximum value of the range of data and substantially reduces a decoding error in the event that the range of values is subsequently estimated and wherein the encoding is performed on data using Adaptive Dynamic Range Coding (ADRC), and encoded data includes a quantization code (Qcode) defined according to an equation selected from the group consisting of:

$$q_i = \left\lfloor \frac{(2^Q - 1)(x_i - CEN)}{DR} + 1/2 \right\rfloor; \text{ and}$$

$$q_i = \left\lfloor \frac{2^Q(x_i - CEN + 1/2)}{DR} \right\rfloor$$

where $q_i$ represents a Qcode, Q represents a number of quantization bits, $x_i$ represents the unencoded data, DR represents a dynamic range of data and CEN represents a central value.

13. The system of claim 12, wherein the maximum and minimum values represent information selected from the group comprising two-dimensional static images, hologram images, three-dimensional static images, video, two-dimensional moving images, three dimensional moving images, monaural sound, and N-channel sound.

14. A system configured to encode data comprising a central value for a range of values that is greater than a minimum value of a range of data and less than a maximum value of the range of data and substantially reduces a decoding error in the event that the range of values is subsequently estimated wherein encoding is performed on said data using Adaptive Dynamic Range Coding (ADRC)

and recovered data is reconstructed from the encoded data according to an equation selected from the group consisting of:

$$x'_i = \left\lfloor CEN + \tfrac{1}{2} + DR\left(\tfrac{q_i}{2^Q - 1} - \tfrac{1}{2}\right) \right\rfloor; \text{ and}$$

$$x'_i = \left\lfloor CEN + \tfrac{DR}{2^Q}(q_i + \tfrac{1}{2} - 2^{Q-1}) \right\rfloor$$

where the $x_i$ represents the recovered data, CEN represents a central value, DR represents a dynamic range of data, $q_i$ represents a Qcode, and Q represents a number of quantization bits.

15. A system configured to encode data comprising a central value for a range of values that is greater than a minimum value of a range of data and less than a maximum value of the range of data and substantially reduces a decoding error in the event that the range of values is subsequently estimated wherein encoding is performed using Adaptive Dynamic Range Coding (ADRC) and the central value is defined as:

$$CEN = MIN + \left\lfloor \tfrac{DR}{2} \right\rfloor$$

where CEN represents the central value, MIN represents a minimum value, and DR represents a dynamic range of data.

16. A system configured to decode a bitstream of encoded data comprising a decoder configured to recover a parameter used to encode the encoded data, said parameter recovered using a central value that is greater than a minimum value of a range of data and less than a maximum value of the range of data and substantially reduces a decoding error in the event that the range of values is estimated and wherein the decoder is further configured to decode data using Adaptive Dynamic Range Coding (ADRC) and recovered data is reconstructed from the encoded data according to an equation selected from the group consisting of:

$$x'_i = \left\lfloor CEN + \tfrac{1}{2} + DR\left(\tfrac{q_i}{2^Q - 1} - \tfrac{1}{2}\right) \right\rfloor; \text{ and}$$

$$x'_i = \left\lfloor CEN + \tfrac{DR}{2^Q}(q_i + \tfrac{1}{2} - 2^{Q-1}) \right\rfloor$$

where the $x_i$ represents the recovered data, CEN represents a central value, DR represents a dynamic range of data, $q_i$ represents a Qcode, and Q represents a number of quantization bits.

17. The system of claim 16, wherein the maximum and minimum values represent information selected from the group comprising two-dimensional static images, hologram images, three-dimensional static images, video, two-dimensional moving images, three dimensional moving images, monaural sound, and N-channel sound.

18. A system configured to decode a bitstream of encoded data comprising a decoder configured to recover a parameter used to encode the encoded data, said parameter recovered using a central value that is greater than a minimum value of a range of data and less than a maximum value of the range of data and substantially reduces a decoding error in the event that the range of values is estimated and wherein the decoder is further configured to decode using Adaptive Dynamic Range Coding (ADRC) and the central value is defined as:

$$CEN = MIN + \left\lfloor \tfrac{DR}{2} \right\rfloor$$

where CEN represents the central value, MIN represents a minimum value, and DR represents a dynamic range of data.

19. An apparatus configured to encode data comprising a means for determining a central value for a range of values by selecting a value that is greater than a minimum value of a range of data and less than a maximum value of the range of data and substantially reduces a decoding error in the event that the range of values is subsequently estimated and wherein encoding is performed on said data using Adaptive Dynamic Range Coding (ADRC), and encoded data includes a quantization code (Qcode) defined according to an equation selected from the group consisting of:

$$q_i = \left\lfloor \tfrac{(2^Q - 1)(x_i - CEN)}{DR} + 1/2 \right\rfloor; \text{ and}$$

$$q_i = \left\lfloor \tfrac{2^Q(x_i - CEN + 1/2)}{DR} \right\rfloor$$

where $q_i$ represents a Qcode, Q represents a number of quantization bits, $x_i$ represents the unencoded data, DR represents a dynamic range of data and CEN represents a central value.

20. The apparatus of claim 19, wherein the maximum and minimum values represent information selected from the group comprising two-dimensional static images, hologram images, three-dimensional static images, video, two-dimensional moving images, three dimensional moving images, monaural sound, and N-channel sound.

21. An apparatus configured to decode a bitstream of encoded data comprising means for recovering a parameter used to encode the encoded data, said parameter recovered using a central value that is greater than a minimum value of a range of data and less than a maximum value of the range of data and substantially reduces a decoding error in the event that the range of values is estimated and wherein decoding is performed on said data using Adaptive Dynamic Range Coding (ADRC) and recovered data is reconstructed from the encoded data according to an equation selected from the group consisting of:

$$x'_i = \left\lfloor CEN + \tfrac{1}{2} + DR\left(\tfrac{q_i}{2^Q - 1} - \tfrac{1}{2}\right) \right\rfloor; \text{ and}$$

$$x'_i = \left\lfloor CEN + \tfrac{DR}{2^Q}(q_i + \tfrac{1}{2} - 2^{Q-1}) \right\rfloor$$

where the $x_i$ represents the recovered data, CEN represents a central value, DR represents a dynamic range of data, $q_i$ represents a Qcode, and Q represents a number of quantization bits.

22. The apparatus of claim 21, wherein the maximum and minimum values represent information selected from the group comprising two-dimensional static images, hologram images, three-dimensional static images, video, two-dimensional moving images, three dimensional moving images, monaural sound, and N-channel sound.

23. An apparatus configured to encode data comprising a means for determining a central value for a range of values by selecting a value that is greater than a minimum value of a range of data and less than a maximum value of the range of data and substantially reduces a decoding error in the event that the range of values is subsequently estimated and wherein encoding is performed on said data using Adaptive Dynamic Range Coding (ADRC) and recovered data is reconstructed from the encoded data according to an equation selected from the group consisting of:

$$x'_i = \left\lfloor CEN + \tfrac{1}{2} + DR\left(\tfrac{q_i}{2^Q - 1} - \tfrac{1}{2}\right)\right\rfloor; \text{ and}$$

$$x'_i = \left\lfloor CEN + \tfrac{DR}{2^Q}(q_i + \tfrac{1}{2} - 2^{Q-1})\right\rfloor$$

where the $x_i$ represents the recovered data, CEN represents a central value, DR represents a dynamic range of data, $q_i$ represents a Qcode, and Q represents a number of quantization bits.

24. An apparatus configured to encode data comprising a means for determining a central value for a range of values by selecting a value that is greater than a minimum value of a range of data and less than a maximum value of the range of data and substantially reduces a decoding error in the event that the range of values is subsequently estimated and wherein encoding is performed using Adaptive Dynamic Range Coding (ADRC) and the central value is defined as:

$$CEN = MIN + \left\lfloor \tfrac{DR}{2} \right\rfloor$$

where CEN represents the central value, MIN represents a minimum value, and DR represents a dynamic range of data.

25. An apparatus configured to decode a bitstream of encoded data comprising means for recovering a parameter used to encode the encoded data, said parameter recovered using a central value that is greater than a minimum value of a range of data and less than a maximum value of the range of data and substantially reduces a decoding error in the event that the range of values is estimated and wherein decoding is performed using Adaptive Dynamic Range Coding (ADRC) and the central value is defined as:

$$CEN = MIN + \left\lfloor \tfrac{DR}{2} \right\rfloor$$

where CEN represents the central value, MIN represents a minimum value, and DR represents a dynamic range of data.

* * * * *